Patented Jan. 15, 1935

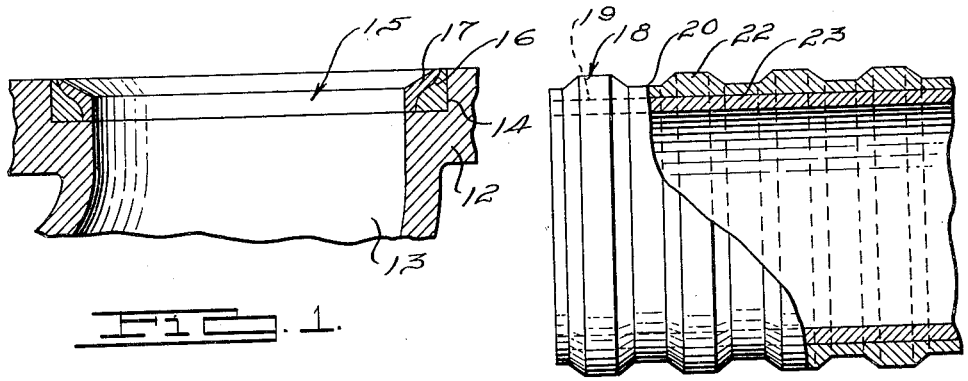
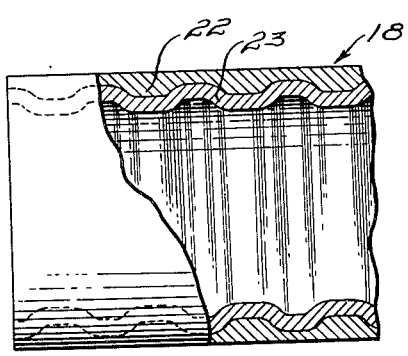
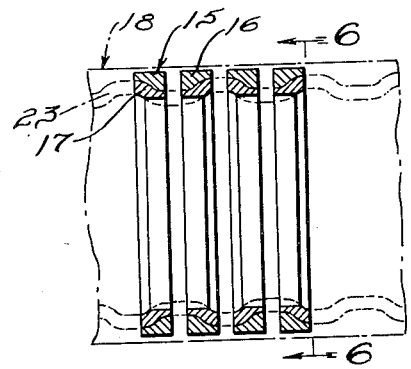
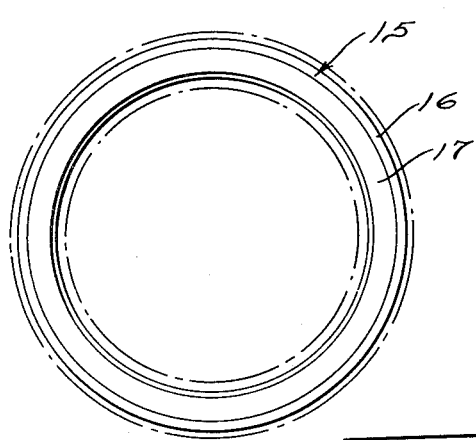
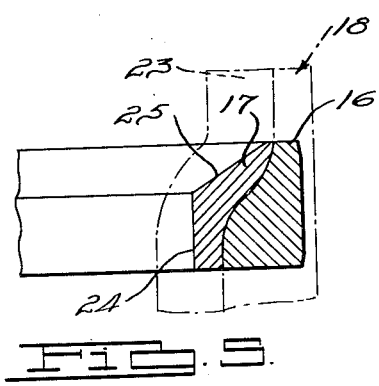

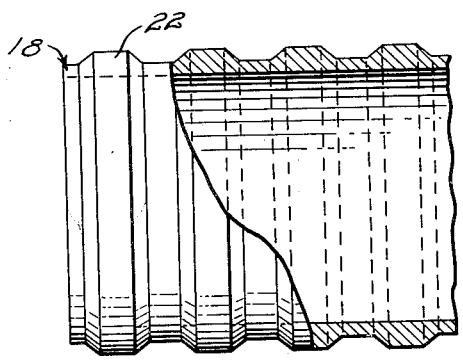
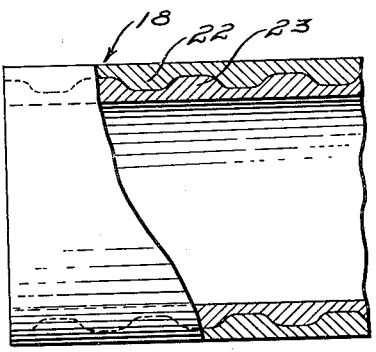
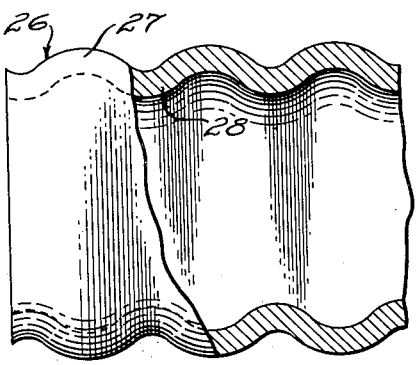
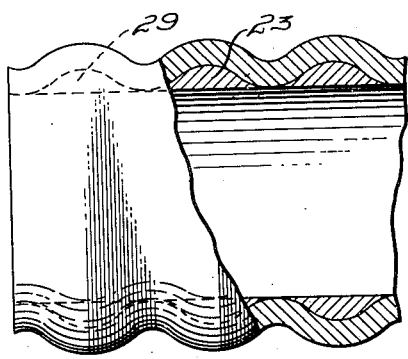
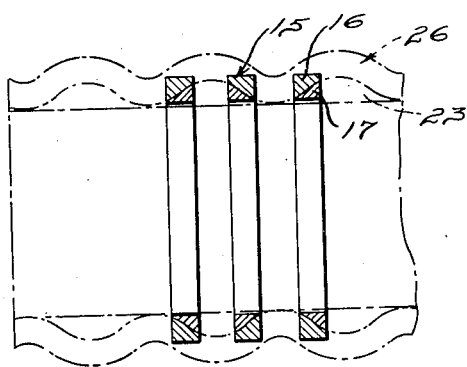
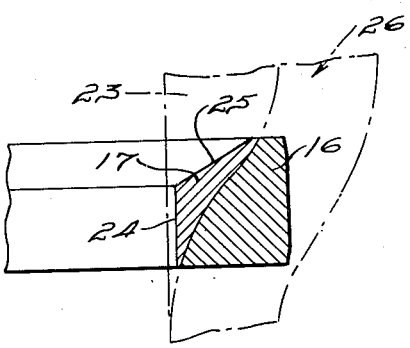

1,987,784

UNITED STATES PATENT OFFICE 1,987,784

METHOD OF FORMING VALVE SEAT INSERTS

Charles B. McDonald, Detroit, Mich., assignor to Wilcox-Rich Corporation, a corporation of Michigan Application April 14, 1932, Serial No. 605,250

5 Claims. (Cl. 29—156.7)

My invention relates to valve seat rings or inserts and particularly to a valve seat ring of the replaceable type and to the method and means employed for constructing the valve seat ring of two or more metals which are bonded together to provide my improved valve seat ring construction.

It has been the practice in the internal combustion engine art to provide valves adjacent to each cylinder for controlling the porting of the fuel and the exhaust gases relative to the cylinder. The valve seat was normally cut into the metal at the mouth of the port, which was engaged by a poppet valve to seal the port in a well known manner. Since the cylinder block was made of cast iron, or a low grade of cast steel, the surface of the seat soon became pitted in the presence of varying temperature conditions, permitting the gases to leak past the valve. The efficient operation of the engine required the repeated dressing of the valve seat surface which was not only an expensive operation but prevented the use of the vehicle. As the surface became too badly worn to be redressed it became the common practice to employ a new ring which was inserted in a recess cut in the mouth of the port and upon which the valve seat was dressed. It was the practice to employ the same material as that employed in the cylinder head or block so as to be of the same coefficient of expansion so that a pressed fit of the ring in the recess would retain the ring at all times in fixed relation therein.

If a material is employed which resists this pitting and flaking, the repeated dressing of the seat would be dispensed with and a more desirable and efficient valve construction provided. Accordingly, I propose to apply a valve seat ring to the mouth of the port of an engine when originally built, having a seat surface of a material which does not pit or flake in the presence of extreme heat conditions which thereby assures an efficient operation of the machine at all times without the necessity of periodically dressing the valves and valve seats.

It will be readily apparent, when providing a valve seat ring having a different coefficient of expansion from that of the material employed in the cylinder head or block, that some means must be provided for securing the seat directly to the shoulder recess, and, accordingly, various methods and devices have been attempted to overcome this particular difficulty. In my copending applications, Serial No. 463,081, filed June 23, 1930; and Serial No. 503,255, filed December 18, 1930, and assigned to the assignee of the present invention, I have disclosed two methods which may be employed for securing a valve seat ring in the mouth of the port when the valve seat ring is constructed of a material having a different coefficient of expansion from that of the material from which the port is constructed.

My present invention is a continuation and an improvement on the construction illustrated and claimed in the above mentioned copending applications, and includes the method of construction and the material employed when bonding to a preformed tube of a material having the same coefficient of expansion as the port walls, a material which resists pitting and flaking when subjected to heat variations and the shock of the seating valve. The body portion of the ring has a greater cross-sectional area than the seat portion for various reasons. The rear body portion of the seat ring is press fitted or otherwise secured to the annular recess at the mouth of the port. Since the material of the body portion has the same coefficient of expansion as the metal of the mouth of the port, the ring will retain the press fit at all times in the presence of any temperature variations. The seat material which is bonded to the body portion is of different coefficient of expansion, and owing to the thin section, the counter strain set up because of this difference in coefficient of expansion, will be ineffective for preventing the body portion of the ring from expanding in the normal manner and retaining the tight engagement with the port wall. A further advantage in employing a thin seat portion resides in the difference in cost of material, it being readily apparent that the special alloy employed for the seat portion of the ring is considerably more expensive than the cheaper cast iron or cast steel construction of the body portion of the ring.

Accordingly, the principal objects of my invention are: to provide a valve seat ring with a seating portion constructed of a metal which resists pitting or flaking in the presence of large temperature variations and supported on a body portion having substantially the same coefficient of expansion as the metal with which the ring contacts; to provide a ring for a valve seat having a body portion of a material having the same coefficient of expansion as that of the metal with which it engages and provided with a seat portion constructed of a metal having a different coefficient of expansion and of a thickness to prevent stresses present because of the difference in coefficient of expansion from preventing the normal expansion of the body portion; to provide a bimetallic ring constructed of metals of different coefficient of expansion in such manner that the resulting expansion is the same as the metal with which the ring contacts; to provide a bond between a seat portion and body portion of a ring which is of sinuous form to effect a large area of engagement therebetween and to minimize the strain set up therebetween because of the difference in coefficient of expansion to prevent the strain from severing the bond; and, in general, to provide a valve seat ring which is simple in construction, economical of manufacture and positively attachable to a supporting element.

Other objects and features of novelty of my invention will be either specifically pointed out or will become apparent when referring, for a better understanding of my invention, to the following description in conjunction with the accompanying drawings, wherein:

Figure 1 is a broken sectional view of an internal combustion engine port having a valve seat ring mounted therein which embodies features of my invention.

Fig. 2 is an enlarged sectional view of a tube initially formed from which the valve seat rings are severed.

Fig. 3 is a view of the structure illustrated in Fig. 2 after swaging operation has been performed thereon.

Fig. 4 illustrates the method of cutting a plurality of the valve seat rings from the tube constructed as illustrated in Fig. 3.

Fig. 5 is an enlarged sectional view of the ring as severed in Fig. 4.

Fig. 6 is a plan view of a finished ring.

Fig. 7 is a view of a tube similar to that illustrated in Fig. 2 showing the initial operation thereon.

Fig. 8 is a view of the tube illustrated in Fig. 6 after a swaging operation has been made thereon and the seat material bonded thereto.

Fig. 9 is a view of a corrugated tube embodying a further modified form of my invention.

Fig. 10 is a sectional view of the tube illustrated in Fig. 8 after the seat material has been bonded thereto.

Fig. 11 is a view of the structure illustrated in Fig. 9 showing the method of severing the ring therefrom, and Fig. 12 is an enlarged sectional view of the completed ring after being severed from the structure illustrated in Fig. 10.

Referring to Fig. 1, I have illustrated a cylinder block or head 12 which is made of cast iron, cast steel or any other well known casting alloy, and provided with a port 13 through which gases are conducted relative to an adjacent cylinder. The mouth of the port 13 is enlarged by a machining operation forming a recess 14 which is utilized for receiving and retaining a valve seat ring 15. To effect a bond between the ring 15 and the wall of the recess 14, I preferably construct the ring to be of press fit with the material forming the recess and find that when the ring is suitably constructed no further bond is required. However, it is to be understood that it is within the purview of my invention to weld, braze or otherwise secure the ring in fixed relation to the recess, the practicability of any method being made possible because the expansion of the ring is the same as that of the metal in which the recess is formed, that is to say, of the block 12.

To construct the ring 15 so as to have substantially the same coefficient of expansion as the metal of the block or head 12 and at the same time to have a seat which is made of relatively hard material which does not pit, peel or flake in the presence of high temperature conditions, I employ a composite valve seat ring, the construction of which will now be described.

It is to be understood that my invention applies to a ring having a body portion 16 and a seat portion 17, which are constructed of different materials, to provide a ring having a seat portion which is far superior in resisting high temperature conditions than the metal which goes to make up the cylinder block or head 12 and which also embodies the same characteristic, as far as expansion is concerned in the presence of changing heat conditions, as that of the metal of the block or head. While the method of constructing this type of ring is also novel, it is to be understood that the invention is not limited to the particular constructions illustrated and which will now be described, but that any method of constructing a ring of the type embodying my invention falls within the scope of my inventive concept.

Referring to Fig. 2, I have illustrated a tube 18 having a plain inner surface 19 and an outer surface 21 which is provided with a plurality of annular ribs or lands 22 of predetermined width and spacing throughout the length of the tube. A tube thus constructed may be cast, forged, welded, machined or otherwise preformed to effect the shape illustrated in the figure, as is well known in the art. After the tube 18 has been so constructed, the seating material 23, which may be any hard, heat-resisting alloy steel, bronze or other alloy, such as stellite, which are well known for their heat-resisting properties, is applied thereto. The alloy is preferably applied centrifugally to the inner surface of the tube 18 in a well known manner, preferably in the presence of a reducing gas, and bonded to the tube. It is to be understood that other methods, well known to be suitable, may be employed for applying the one metal to the other and may include mechanical anchoring means and the employment of a flux for procuring a complete bond. After the tube has been formed in this manner into a unit tubular element, a swaging process is employed for smoothing the outer surface of the tube and forcing the ribs or lands 22 inwardly to cause the inner surface of the tube to take the sinuous form illustrated in Fig. 3.

When so constructed, the ribs 22 extend inwardly of the inner surface of the tube with an equal thickness of the seat alloy 23 extending along the inner irregular contour. After the tube is formed in this manner it is divided into sections, as illustrated in Fig. 4, substantially the length of the finished ring 15, with each rib or land portion 22 forming two complete ring elements. In this manner, very little waste material results and substantially the entire tube is utilized to form a plurality of rings.

In Fig. 5, I have shown an enlarged sectional view of the ring thus constructed wherein the body portion 16 of the ring is formed from the material of the tube 18, while the seat portion 17 is formed from the alloy 23 provided on the inner surface of the tube. It will be noted that the cross-sectional area of the body portion 16 is considerably greater than that of the seat portion 17, which is desirable, since the body portion is constructed of a metal having the same coefficient of expansion as the metal of the recess 14 so that a press fit will, at all times, be retained between the ring seat and the recess, in the presence of varying temperature conditions.

The thin layer of alloy 23, which has a different coefficient of expansion from that of the metal in the body portion 16, will prevent the stresses resulting therefrom, opposing the expansion of the ring as a unit in accordance with the degree of expansion of the metal employed in the body portion 16. The difference between the cross sectional area of the seat 17 and that of the backing material 16 is of such preponderance, that the alloy 23 of the seat will follow the expansion of the backing material 16 without in any way hindering its complete expansion and contraction in accordance with known expansion of the metal. In this manner, a seat of hard material, having a coefficient of expansion different from that of the metal of the cylinder head or block, may be employed in view of the resulting coefficient of expansion to the unit ring construction, which is the same as that of the block. It is to be understood that in some constructions, each metal of the bimetallic ring may have a different coefficient of expansion from that of the block, so long as the resulting expansion and/or contraction is the same as that of the block.

In order to uniformly distribute the stresses which will be present at the junction between the alloy 23 and the body portion 16 of the ring and at the same time to provide a thin section of the alloy, the joint is sinuous in form following, somewhat, the contour of the finished surface of the seat portion, that is to say of the cylindrical portion 24 and the tapered seat portion 25 of the ring.

In a ring constructed in this manner, stresses will be distributed substantially in all directions in the seat portion 17 and will not be a direct lateral force or lag relative to the expansion of the body portion 16, to thereby prevent the disruption of the bond between the two portions. That is to say, the sinuous bond between the two portions, that go to make up the ring, so distribute the stresses present in view of the different coefficients of expansion between the two elements, that the bond is prevented from being severed. The ring thus formed has the properties of retaining a press fit at all times with the recess in the cylinder block or head and has permanently attached thereto a seat portion of hard, temperature-resisting metal desirable in valve seat constructions.

Referring to Figs. 7 and 8 I have shown a modified form of the steps employed in constructing the valve seat as illustrated in Figs. 2 to 5 inclusive, which includes the formation of a tube 18 which is exactly similar to the tube 18 illustrated in Fig. 2, but which has the swaging operation applied thereto before the alloy is centrifugally cast therein. The swaging operation on the tube 18 forces the tube into a contour similar to that illustrated in Fig. 3, and as shown in Fig. 8. That is to say, the annular ribs or lands 22 extend inwardly of the tube after the swaging operation. The alloy 23 is then cast, preferably by a centrifugal operation, on the inner surface of the tube in the same manner as the alloy was cast on the inner surface of the tube 18, before swaging. The difference between the two operations results in less waste to the alloy 23, as will be apparent from a comparison of the tube as illustrated in Figs. 3 and 8. It will be noted that in Fig. 3 the thickness of the alloy 23 is constant throughout the length of the tube, while in Fig. 8 the thickness varies in accordance with the position of the lands 22 and the grooves therebetween, provided on the inner surface of the tube. As will be apparent from Fig. 4, a considerable amount of the material 23 is machined away and because of the cost of the alloy, this waste is objectionable. This wasting of material is materially reduced in the construction illustrated in Fig. 8, otherwise the resulting valve seat ring 15 is exactly the same as that shown in Fig. 5.

A further method which may be utilized for constructing the valve seat ring is illustrated in Figs. 9 to 12 inclusive, wherein a tube 26 is corrugated by expanding or contracting the tube at predetermined spaced intervals, as at 27 and 28, respectively, as illustrated in Fig. 9. The inner surface of the tube is substantially the same as the inner surface of the tube 18 after it has been swaged, providing annular troughs 29 to which the alloy 23 is bonded, preferably by the centrifugal process as above outlined in regard to the construction illustrated in Figs. 2 and 8, or by any other well known method which is suitable for permanently retaining the alloy 23 on the inner surface of the tube. The tube 26 may be corrugated in any well known manner and thereby eliminates the swaging, machining or forging process.

After the tube has been formed as illustrated in Fig. 9, it is machined on its outer surface and then divided up into sections forming the rings 15, as illustrated in Fig. 10. The surface 24 is preferably machined while the tube is a unit and the truncated conical seat 25 is machined on each ring after severance. In Fig. 11 I have shown an enlarged section of the ring thus constructed, which is substantially similar to the ring illustrated in Fig. 5 and constructed from the foregoing methods. The ring constructed in accordance with the process illustrated in Figs. 9 to 12 produces the same result as the ring illustrated in Fig. 5, that of permitting the body portion 16 of the ring to expand and contract in accordance with the expansion and contraction of the cylinder head of the block and to be in no way restrained by the alloy 23 forming the seat 17, owing to its thin construction. In view of the thin construction of the seat 17 and the sinuous bond between the seat of the backing portion, the bond will withstand the stresses set up between the two portions and the ring will at all times be retained as a unit element and in fixed relation to the cylinder head or block. It is to be understood when both the tube 26 and the alloy 23 have different coefficients of expansion which are different from that of the material of the block, that they are constructed of such relative cross sectional areas that the resulting coefficient of expansion of the unit ring 15 is the same as that of the metal of the cylinder head or block 12.

While it would be possible to construct a sinuous surface on the port adjacent to the mouth thereof and attach thereto by welding, brazing or other means a seat of the alloy 23, it will be readily apparent that the more practical construction would be to provide a complete seat and to construct a recess on the mouth of the port so that in case the seat should at any time become defective it could be readily renewed in service. It is submitted, further, that a more complete bonding of the two metals will be effected in the unit construction illustrated in Figs. 2 to 12 inclusive, rather than by the individual construction and that the replaceable valve seat ring formed of the two different metals is a more practical construction and provides a ring which will be retained at all times in fixed position.

While I have described and illustrated several embodiments of my invention, it will be apparent to those skilled in the art that various changes, omissions, additions and substitutions may be made therein without departing from the spirit and scope of my invention, as set forth in the accompanying claims.

I claim:

1. The method of constructing valve seat rings which includes the steps, of constructing a tube having an inner sinuous surface formed by longitudinally spaced, laterally extending raised portions forming spaced portions of greater and less diameter, of bonding a metal thereto forming a substantially smooth inner surface to the tube, of dividing the tube into a plurality of elements, and of dressing the elements to form the valve seat rings.

2. The method of forming valve seat rings which includes the steps of preforming a tube of soft material to provide grooved portions therein, of bonding a hard valve seat material to the grooved portions of said tube, and separating said tube into a plurality of ring-like elements by cutting through the tubular portion only.

3. The method of forming valve seat rings which includes the step, of providing grooves in the inner surface of the ring, of centrifugally casting a hard valve seat material in said grooves in a manner to be bonded thereto, and separating said tube into a plurality of rings through the cutting of the tube between the grooves.

4. The method of forming a plurality of valve seat rings of different inner and outer material which includes, the preforming of the inner surface of a tubular element so as to provide a plurality of recessed portions, of bonding a hard valve seat material in the recesses so formed spaced by the tubular material, and severing said tube into a plurality of rings by cutting through the tubular material.

5. The method of forming a plurality of valve seat rings of different inner and outer material which includes, the preforming of the inner surface of a tubular element so as to provide a plurality of recessed portions, of bonding a hard valve seat material in the recesses so formed to constitute alternate portions with the tubular material throughout the inner surface of the tube, severing said tube into a plurality of rings by cutting through the tubular material, and thereafter dressing said rings to form valve seats.

CHARLES B. McDONALD.